United States Patent Office 3,692,702
Patented Sept. 19, 1972

---

3,692,702
SEMICONDUCTIVE CONTACT ADHESIVE
Anthony R. Lania, Watertown, and Neil Kirkegard, Jr., Randolph, Mass., assignors to Chase Corporation, Randolph, Mass.
No Drawing. Filed Aug. 26, 1970, Ser. No. 67,239
Int. Cl. H01b 1/06
U.S. Cl. 252—511                                    15 Claims

---

ABSTRACT OF THE DISCLOSURE

A semiconducting contact adhesive comprising a vulcanizing agent, a vulcanizable polymer such as poly(2-chloro-1,3-butadiene), and a carbon black for imparting semiconducting properties thereto. The carbon black is advantageously of a high surface:absorptivity ratio. The adhesive is characterized by its excellent viscosity characteristics, excellent shelf life, very high initial strength, and high degree of surface-selectivity.

---

BACKGROUND OF THE INVENTION

There has been need of an improved, reliable, easily-applied semiconducting adhesive.

Such adhesives are desirably used in manufacture of electric-power-carrying cables of the type which comprise copper conductor strands enclosed within an insulating sheath such as polyethylene. In such cables, it is usually desirable to have a semiconducting material between the copper conductors and the insulating sheath to "cushion" the insulator from the effect of the large quantity of electricity carried in the vicinity of the circumference of the conductor portion of the cable by avoiding corona or other phenomena induced by electricity which, but for the presence of a semiconductor layer, could be induced at the conductor-insulator interface. Such corona would, in turn, result in the formation of ozone which tends to accelerate the degradation of polyethylene and most other polymeric insulating materials.

To achieve lateral continuity of the semiconducting layer, it is desirable to use a semiconducting adhesive for sealing or joining semiconductive tapes or sheets which are applied over the conductor. In the past, the adhesives used to seal such tapes or sheets have been insulating adhesives which must be carefully applied in very thin layers to assure a minimal interruption of the semiconductive cushioning layer. In general such insulating adhesives have had resistivity levels of from about $10^{10}$ to $10^{15}$ ohms.

Other criteria which must be met by adhesives used in the aforementioned power-cable application include (1) the absence of chemical constituents which will migrate to attack the conductor metal or the polymeric insulation and (2) the absence of chemical constituents which will be attacked by the copper or any ingredients migrating from the polymeric insulating sheathing.

Among the valuable attributes sought in any semiconductive material to be used in this application are good shelf life, as measured by maintenance of both viscosity and conductivity characteristics during storage, good initial bond even without cure of the adhesive, selectivity of the material with respect to its sticking tendencies after it has been coated on a surface, and good brushing characteristics.

Thus far, no suitable semiconductor adhesive has been available for the above application.

SUMMARY OF THE INVENTION

Therefore, an object of the invention is to provide an improved semiconductive adhesive compound meeting the requirements of the power cable manufacturing industry.

Another object of the invention is to provide a semi-conductive adhesive characterized by an excellent shelf life and a low viscosity at high loadings of carbon black.

A further object of the invention is to provide a semi-conductive adhesive which drys within a very short time to a highly surface-selective contact adhesive.

Still another object of the invention is to provide an improved semiconductive adhesive based on a vulcanizable polymer such as neoprene.

Another object of the invention is to provide a process for making such an improved adhesive.

Other objects of the invention will be obvious to those skilled in the art on reading the instant application.

The above objects have been substantially achieved by the formation of a semiconductive adhesive which comprises a polymer phase based on a vulcanizable polymer like neoprene, and a carbon black characterized by very low oil absorption with respect to its high surface area. The most advantageous embodiment of the invention includes (in addition to the vulcanizable polymer and the select carbon black) a solvent mixture for the polymer; a mixture of surfactants for dispersing aids including a film-forming surfactant; a tack-contributing resin; a select highly-aromatic and somewhat polar rubber-processing oil; and a heat reactive phenolic resin which is pre-reacted with the vulcanizing agent in an organic reaction medium.

The adhesive of the invention is characterized by a solids content of over 30% in storage and on application, a viscosity of from 2000 to 20,000 cps., a resistivity of about 50 to about 500 ohms through a lap splice one inch square and 0.002 inch thick after a 24-hour set at 25° C., and, also after a 24-hour cure at 25° C., a lap shear strength of 100 p.s.i. minimum in bonding steel foil to steel foil.

On application, the adhesive will dry quickly, within one to five minutes under the range of temperatures and humidities commonly encountered under industrial working conditions, to a tack-free "dry state." In this dry state the material is characterized by an extraordinary degree of "selectivity." By selectivity is meant that the adhesive will selectively bond to itself on contact but will resist bonding to other surfaces. This characteristic is particularly important because it allows a workman to dispense with precautionary steps which would otherwise have to be taken to assure non-sticking of the adhesive on surrounding surfaces to which sticking is not desirable. This dry state of the adhesive has the advantage of remaining for a period of about 30 minutes before the adhesive crystalizes to the degree that the contact-adhesiveness of the material diminishes excessively.

Storage life of the adhesive is excellent: a minimum of six months and longer where high temperatures can be avoided. It may be thinned with suitable organic solvents, say a 50–50 mixture of ethyl acetate and methyl ethyl ketone, to a brushable consistency if it has thickened excessively during storage. In general, however, retention of viscosity characteristics on storage is very good and this is believed to be assignable, in large part, to the low oil absorptivity of the carbon black.

The carbon black which is utilized in the invention is advantageously characterized by a relatively high surface area and a relatively low absorptivity. The high surface area is desirable in that it allows a given mass of carbon black to be so distributed in the resinous mass that the average distance from particle to particle is relatively small. The low absorptivity has been found to be desirable because it allows higher carbon black loadings, again reducing the gap between carbon particles and also (1) absorbing less oil, thereby allowing the oil to remain in the fluid component of the dispersion and (2) having a minimal tendency to attract or absorb active vulcanizing sites from the vulcanizing agent. The non-interference with the vulcanizing agent is believed to allow a more precise predictability of that quantity of vulcanizing agent which will give the desired balance between shelf life during storage and cure time during use.

A particularly advantageous carbon black useful in the process of the invention is that having a surface area of about 450 square meters per gram, as measured by the nitrogen-absorption method commonly known as the Brunauer-Emmett-Teller (BET) method, and an oil absorption value of about 110 milliliters per 100 grams as measured by the oil absorption known in the carbon art. Such a black is available in the form of a black dispersion sold under the trade designation XC–3017L by United Carbon Company. In general, such carbon blacks of the furnace type having at least 95% fixed carbon, a surface area of 300 square meters per gram, a surface area:oil absorption ratio of greater than 2:1 are operable. Ratios of 3.0 to 1 or higher with blacks having an area of over 400 square meters per gram are most advantageous.

The vulcanizable polymeric component of the mixture must be dissolved in a suitable organic solvent. A number of solvent systems are suitable for use with neoprene, but some attention should be given to selection of a system which can be utilized by a workman without being excessively toxic or malodorous. A mixture of equal parts of ethyl acetate, methyl ethyl ketone, toluene, and naphtha of the aliphatic type has been found entirely suitable for use in formulating semiconductive adhesives according to the invention.

It is usually desirable to use surfactants to aid in the dispersion and/or emulsification of the various components of the mixture. A mixture comprising a film-forming resinous dispersing agent sold under the trade designation Raybo 56 by Raybo Chemical Company has been found particularly advantageous. This material is a film-forming surface active agent which materially aids the dispersion of carbon black in the hydrocarbon vehicle portion of the adhesive composition. Used in conjunction with the film-forming agent is another pigment-dispersing agent sold under the trade designation Tenlo 70 by the Nopco Chemical Division of Diamond Alkali Company. Both agents are characterized by not interfering with the electrical conductivity of the carbon black.

An important component of the contact adhesive of the invention is the polymer commonly known as neoprene or (2-chloro-1,3-butadiene). However, equivalent vulcanizable synthetic polymers which are susceptible to substantial solvation are also intended to be included within the scope of the invention.

A convenient vulcanizing agent for use with the composition of the invention included a calcined magnesium oxide. The magnesium oxide is advantageously a calcined material of the type commonly used in neoprene-vulcanizing operations. In the preferred embodiments of the invention the composition which acts as the vulcanizing agent contains calcined magnesium oxide, a small amount of water, a relatively large quantity of an organic resin, and a sufficient quantity of aromatic solvent. This solvent is a means to dissolve this organic resin component and also provides the major liquid vehicle for the magnesium oxide.

This organic resin is so selected that it is reactive with the magnesium oxide to form a kind of resinous vulcanizing agent which then reacts with the neoprene. A modified phenolic resin of the type sold under the trade designation SP–156 by Schenectady Chemicals, Inc. is particularly suitable for use in the invention as the reacting resin used in the vulcanizing composition. Toluene is a suitable solvent medium in which the aforesaid phenolic resin, magnesium oxide may be dissolved and/or dispersed. A small quantity of water is usually used in conjunction with the calcined magnesium oxide to facilitate the reactivity of this inorganic material.

It is generally desirable to include a tackifying agent in the formulation. Conveniently used is a terpene phenolic resin such as that sold under the trade designation SP–560 by Schenectady Varnish Company, Inc. This material is an oil-soluble thermoplastic, has a melting point of 265–275° F., an acid number of 60–70 and exhibits a viscosity of about 100 to 165 cps. in a 60% level in toluol.

The hydrocarbon "rubber compounding" oil should be a relatively polar material, for example, a coal tar-derived oil having a major aromatic portion. Such oils may not be polar in the absolute sense, but they are in the relative sense well understood in the polymer-, and especially rubber-processing art. One advantageous oil is sold under the trade designation Bardol B. This material is highly aromatic, has a specific gravity of about 1.00 to 1.04 at 25° F. and an evaporating range between 230° F. and 310° F.

ILLUSTRATIVE EXAMPLE OF THE INVENTION

In order to point out more fully the nature of the present invention, the following working examples are given as illustrative embodiments of the present process and products produced thereby.

This rubber-compounding oil, or plasticizer as it is sometimes called, should be characterized by a mean resistivity of less than about 600 ohm-cm. when tested according to ASTM D–991 in a test formulation as follows:

| Material: | Parts by weight |
|---|---|
| SBR–1500 [1] | 100 |
| Carbon black [2] | 50 |
| Plasticizer | 10 |

[1] Commonly-known grade designation for a styrene-butadiene rubber.
[2] Sold under the trade designation Vulcan C by Cabot Corporation. Vulcan C is an N293 carbon black.

Most advantageously, the resistivity is less than about 400 ohm-cm. Bardol B exhibits resistivities of 436 ohm-cm. at a 10-part loading and 256 ohm-cm. at a 20-part loading.

Most advantageously, the plasticizer or processing oil selected is one the addition of which reduces the mean resistivity of the test formulation when the oil loading is increased from 10 to 20 parts.

Ten ounces of a carbon black sold under the trade designation 3017–L by United Carbon Company was grossly dispersed in a solvent mixture comprising 30 ounces of ethyl acetate, 30 ounces methyl ethyl ketone and 30 ounces of naphtha. Then 0.2 ounce of a film-forming surfactant sold under the trade designation Raybo 56 and 0.2 ounce of a surfactant comprising fatty amides plus polyethylene glycol ester and sold under the trade designation Tenlo 70 by Nopco Chemical Company were added to the gross dispersion. Agitation was continued for about 15 minutes after the addition of the pigment-dispersing surfactants.

Next, 5 ounces of an aromatic rubber-processing oil sold under the trade designation Bardol B by Allied Chemical Company and 10 ounces of a terpene phenolic resin sold under the trade designation SP–560 by Schenectady Varnish Company, Inc. are mixed in the above-described ingredients until the resin is dissolved. This will take about 30 minutes with good agitation at 70° F. The terpene phenolic resin has an acid number of from 60 to 70 and a melting range of 265–275° F.

Twenty ounces of neoprene AD–10 are bonded on a rubber mill, sheeted off thin, and chopped into small pieces to facilitate its solvation by the mix. The pieces of neoprene are dissolved in the solvent-and-resin-containing mixture described above, preferably being added thereto while the neoprene pieces are still warm from the bonding procedure.

In a separate vessel, 20 ounces of toluene and 0.2 ounce of water are mixed together. Then one ounce of magnesium oxide of the extra light calcined (ELC) grade and 10 ounces of a heat-reactive phenolic, sold under the trade designation SP–156 by Schenectady Chemicals, Inc., are mixed into the toluene vehicle and the resultant mixture is agitated at 70° F. for three hours during which time a pre-reaction, between the magnesium oxide and SP–156, takes place.

The neoprene-containing mixture and magnesium oxide-containing mixture are blended together until an adhesive of uniform texture is attained. The viscosity and solids levels are adjusted with a 50–50 mixture of ethyl acetate and methyl ethyl ketone (MEK) to produce a material having the following characteristics:

Solids—34%
Viscosity (as measured by Brookfield Viscometer Model LVF) by using 2#2 Spindel at 30 r.p.m. is approximately 4,000 cps.

In applying this adhesive a thin brush coat of adhesive is applied to each of two clean surfaces to be bonded to one another. The adhesive "drys" under ambient conditions in about three minutes to a highly selective contact adhesive. Then the coated surfaces are contacted and rolled together while on a firm supporting surface with a hand steel roller.

So bonded, the adhesive initially provides at least about 50% of its ultimate bond strength, a fact which greatly facilitates the manipulation of the bonded materials in production operations. The adhesive may be heated if it is desired to accelerate its curing to maximum bond strength.

It is believed that no other adhesive is available which provides such high loadings of solids, i.e., loadings of 30% or higher: such high loadings of carbon (about 40% or more of all solids); and, yet maintains such good viscosity stability.

It is, of course, to be understood that the foregoing examples are intended to be illustrative and that numerous changes can be made in the reactants, proportions, and conditions set forth therein without departing from the spirit of the invention as defined in the appended claims.

What is claimed is:

1. In an adhesive formulation of the kind comprising: (1) a vulcanizable polymer, (2) a vulcanizing agent for said polymer, (3) an organic liquid solvent for said polymer, and (4) a pigment,
   the improvement wherein said pigment is a furnace carbon black characterized by (a) a BET surface area of greater than 300 square meters per gram and (b) an oil absorption value, in terms of milliliters per 100 grams of black, which is less than twice the value of said BET surface area,
   and wherein said adhesive is characterized by an initial viscosity of from 2,000 to 20,000 cps. and a pot-life in the liquid state of at least six months under conditions of Standard Temperature and Pressure.

2. An adhesive as defined in claim 1 wherein said polymer is noeprene, said vulcanizing agent is a reaction product of magnesium oxide and a heat-reactive phenolic resin, wherein said carbon black has a BET value of over 400 square meters per gram and an oil absorption value, in milliliters per 100 grams of black, or less than one-third said BET value.

3. A semiconductive adhesive formulation as defined in claim 1 having at least 30% by weight of carbon black, a resistivity of less than 500 ohms through a 0.002 inch x one inch x one inch, splice after a 24-hour set at 25° C.

4. An adhesive formulation as defined in claim 3 wherein at least about 40% of said solids is carbon black.

5. An adhesive as defined in claim 1 wherein said vulcanizable polymer is neoprene.

6. An adhesive as defined in claim 5 wherein said vulcanizing agent is a reaction product of calcined magnesium oxide and a heat-reactive phenolic resin.

7. An adhesive as defined in claim 2 wherein said phenolic resin is a terpene phenolic resin.

8. An adhesive as defined in claim 3 wherein said vulcanizable polymer is neoprene.

9. An adhesive as defined in claim 3 wherein said vulcanizing agent is a reaction product of calcined magnesium oxide and a heat-reactive phenolic resin.

10. An adhesive as defined in claim 3 wherein said phenolic resin is a terpene phenolic resin.

11. An adhesive as defined in claim 1 containing a minor amount of a relatively non-volatile aromatic polar-processing oil component and a major amount of a relatively volatile solvent component.

12. An adhesive as defined in claim 11 wherein said organic liquid medium comprises a quantity of aromatic, polar rubber-processing oil in a quantity of about 25% by weight of the quantity of neoprene and 50% by weight of the carbon black.

13. An adhesive as defined in claim 12 whereas said processing oil is characterized by its ability to maintain a resistivity of less than 600 ohm.-cms., according to ASTM D–991, in a formulation comprising 100 parts by weight of a styrene butadiene rubber of the type known as SPR–1500, 10 parts of a N293-type carbon black, and 10 parts of said processing oil.

14. A bond formed of two plys of semiconductive material and the adhesive of claim 1, said adhesive being in the dry state.

15. An adhesive as defined in claim 1 and characterized by a solids content of over 30% by weight; a viscosity of less than about 20,000 cps.; a resistency of from 50 to 500 ohms as measured through a lap splice one inch square, 0.002 inch thick as measured after 24 hours at 25° C.; and a lap shear strength of 100 p.s.i. in bonding steel foil to steel foil, also as measured after 24 hours at 25° C.

References Cited

Delmonte: Metal-Filled Plastics, Reinhold, N.Y., 1961, pp. 176–177.

DOUGLAS J. DRUMMOND, Primary Examiner